United States Patent
Li et al.

(10) Patent No.: US 11,055,720 B2
(45) Date of Patent: Jul. 6, 2021

(54) PAYMENT VERIFICATION METHOD AND APPARATUS

(71) Applicant: Huawei Technologies Co., Ltd., Shenzhen (CN)

(72) Inventors: Guoqing Li, Shenzhen (CN); Jingqing Mei, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/312,917

(22) PCT Filed: Jun. 29, 2016

(86) PCT No.: PCT/CN2016/087763
§ 371 (c)(1),
(2) Date: Dec. 21, 2018

(87) PCT Pub. No.: WO2018/000275
PCT Pub. Date: Jan. 4, 2018

(65) Prior Publication Data
US 2019/0354980 A1    Nov. 21, 2019

(51) Int. Cl.
*G06Q 30/00* (2012.01)
*G06Q 20/40* (2012.01)
(Continued)

(52) U.S. Cl.
CPC ....... *G06Q 20/409* (2013.01); *G06Q 20/3227* (2013.01); *G06Q 20/3672* (2013.01); *G06Q 20/4014* (2013.01)

(58) Field of Classification Search
CPC .................................................. G06Q 20/409
(Continued)

(56) References Cited

U.S. PATENT DOCUMENTS 8,935,187 B2 * 1/2015 Higgins, Sr. ....... G06Q 20/4012
705/76
2008/0222048 A1    9/2008 Higgins et al.
(Continued)

FOREIGN PATENT DOCUMENTS

CN    101458794 A    6/2009
CN    102054316 A    5/2011
(Continued)

OTHER PUBLICATIONS

ProQuestDialogNPL Search History.*
(Continued)

*Primary Examiner* — John H. Holly
(74) *Attorney, Agent, or Firm* — Slater Matsil, LLP

(57) ABSTRACT

A payment verification method and apparatus are disclosed. The method includes: if a payment terminal detects that there is valid verification information in a secure storage of the payment terminal, changing, by the payment terminal, a cardholder verification method (CVM) supported by a currently used payment card to "no CVM required", where the payment card is a preset card or a card selected by a user, and the secure storage of the payment terminal is a trusted storage area in a trusted execution environment (TEE) or a secure storage area in a rich execution environment (REE); and notifying, by the payment terminal, the settlement terminal that the CVM supported by the payment card is "no CVM required", so that the settlement terminal performs verification on the user and completes a transaction according to "no CVM required".

17 Claims, 6 Drawing Sheets

(51) Int. Cl.
*G06Q 20/32* (2012.01)
*G06Q 20/36* (2012.01)

(58) Field of Classification Search
USPC .......... 705/44, 1.1, 76, 16, 21, 26.1, 59, 71; 380/44, 262, 278, 279
See application file for complete search history.

(56) References Cited

U.S. PATENT DOCUMENTS

| | | |
|---|---|---|
| 2009/0150248 A1 | 6/2009 | Ling et al. |
| 2014/0379354 A1 | 12/2014 | Zhang et al. |
| 2015/0235225 A1 | 8/2015 | Christie |
| 2016/0057619 A1* | 2/2016 | Lopez .................... G06F 9/455 380/247 |
| 2016/0092876 A1* | 3/2016 | Kamal .................... G06Q 20/32 705/44 |
| 2016/0132880 A1 | 5/2016 | O'Regan et al. |
| 2016/0162893 A1 | 6/2016 | Kamal et al. |

FOREIGN PATENT DOCUMENTS

| | | |
|---|---|---|
| CN | 103679452 A | 3/2014 |
| CN | 104517211 A | 4/2015 |
| CN | 104732397 A | 6/2015 |
| CN | 105518732 A | 4/2016 |
| WO | 2010111023 A1 | 9/2010 |
| WO | 2015095771 A1 | 6/2015 |
| WO | 2015179637 A1 | 11/2015 |
| WO | 2016048797 A1 | 3/2016 |

OTHER PUBLICATIONS

China UnionPay, "Requirements of China UnionPay for non-contact mobile applications based on the cloud payment platform," Version 1.0., 2014, 37 pages.

* cited by examiner

PAYMENT VERIFICATION METHOD AND APPARATUS

CROSS-REFERENCE TO RELATED APPLICATIONS

This application is a National Stage of International Application No. PCT/CN2016/087763, filed on Jun. 29, 2016, which is hereby incorporated by reference in its entirety.

TECHNICAL FIELD

This application relates to the field of mobile payment technologies, and in particular, to a payment verification method and apparatus.

BACKGROUND

A cardholder verification method (Cardholder Verification Method, CVM) is a method that is used by a bank card issuing bank to verify an identity of a cardholder and prevent unauthorized use of a bank card. The CVM requires that the cardholder should provide, when using the bank card to complete a payment transaction, the issuing bank with verification data (for example, a PIN (Personal Identification Number, personal identification number) code or a signature) that proves that the cardholder is the owner of the card. After receiving the verification data, the issuing bank performs verification on the verification data (online verification), and determines, according to a result of the verification, whether the transaction succeeds or the transaction is rejected. In recent years, international card organizations such as Mastercard and Visa define a new cardholder verification method, that is, a consumer device cardholder verification method (Consumer Device Cardholder Verification Method, CD-CVM). This verification method is mainly applied to a scenario in which a mobile terminal is used as a payment terminal to perform a contactless payment, for example, Apple Pay or Samsung Pay, and a user can avoid entering a PIN code on a POS (Point of Sale, point of sale) terminal during a transaction. When performing a contactless payment transaction, a cardholder may first select a card on a payment terminal, and enter identity verification data by using the payment terminal, and then the cardholder uses the payment terminal to touch a contactless (Contactless) POS terminal. After receiving transaction data sent by the payment terminal, the contactless POS terminal processes the transaction data. If the POS terminal also supports the CD-CVM, the POS terminal determines that cardholder verification on a card being used has succeeded, and can continue to perform a subsequent procedure to complete the payment transaction.

However, a large quantity of contactless POS terminals are currently deployed in the market, and the deployed contactless POS terminals do not support the newly emerged cardholder verification manner CD-CVM. If the POS terminal does not support the CD-CVM, when the user performs a contactless payment transaction by using the payment terminal, the POS terminal cannot successfully perform cardholder verification even if the POS terminal receives a transaction request message, indicating that a card supports the CD-CVM, sent from the card. As a result, the user needs to additionally enter a PIN code on the POS terminal or provide a signature; otherwise, the payment transaction cannot be completed. This consequently degrades user experience during a contactless payment.

SUMMARY

Embodiments of this application provide a payment verification method and apparatus, so that, if a POS terminal does not support a CD-CVM, a payment terminal uses terminal-side user identity verification to replace an operation, required by the contactless POS terminal, of entering a PIN code or providing a signature.

An embodiment of this application provides a payment verification method, including: if a payment terminal detects that there is valid verification information in a secure storage of the payment terminal, changing, by the payment terminal, a cardholder verification method CVM supported by a currently used payment card to "no CVM required", where the payment card is a preset card or a card selected by a user, and the secure storage of the payment terminal is a trusted storage area in a trusted execution environment TEE or a secure storage area in a rich execution environment REE; and notifying, by the payment terminal, the settlement terminal that the CVM supported by the payment card is "no CVM required", so that the settlement terminal performs verification on the user and completes a transaction according to "no CVM required".

According to the method provided by this embodiment of this application, after determining that cardholder identity verification succeeds, the payment terminal sends a cardholder verification method change message to the settlement terminal, so that a cardholder identity verification method supported by a current payment transaction is changed to "no cardholder verification required", the settlement terminal does not need to perform cardholder identity verification, and the payment terminal uses terminal-side user identity verification to replace an operation, required by a contactless POS terminal, of entering a PIN code or providing a signature.

Optionally, before the notifying, by the payment terminal, the settlement terminal that the CVM supported by the payment card is "no CVM required", the method further includes: if the payment terminal detects that there is no valid verification information in the secure storage of the payment terminal, sending, by the payment terminal to a cloud verification server, a verification request that includes a verification parameter; and receiving, by the payment terminal, verification information returned by the cloud verification server, where the verification information is generated and sent after verification performed by the cloud verification server on the verification parameter succeeds.

According to the foregoing method, the payment terminal may obtain the verification information by using the cloud verification server, so as to avoid a case in which the verification information cannot be obtained when there is no valid verification information locally, thereby improving payment transaction experience while ensuring transaction security.

Optionally, before the payment terminal detects that there is valid verification information in the secure storage of the payment terminal, the method further includes: receiving, by the payment terminal, first identity verification data, and determining that the first identity verification data matches second identity verification data that is stored in the secure storage of the payment terminal.

According to the foregoing method, the payment terminal verifies the first identity verification data of the user by using the second identity verification data, thereby improving payment transaction security.

Optionally, the verification information includes a validity period parameter; the validity period parameter is a preset validity time that is set by the cloud verification server, and the verification information is valid within the preset validity time; and the detecting, by a payment terminal, that there is valid verification information in a secure storage of the payment terminal includes: if detecting that there is the verification information in the secure storage of the payment terminal and determining that a preset validity time corresponding to the verification information does not expire, determining, by the payment terminal, that there is valid verification information in the secure storage.

Optionally, the verification information is a quantity of payment transactions that is set by the cloud verification server, the quantity of payment transactions is decreased by 1 each time the payment terminal performs a successful payment transaction by using the payment card, and the quantity of payment transactions is valid when not being 0; and the detecting, by a payment terminal, that there is valid verification information in a secure storage of the payment terminal includes: if detecting that there is the quantity of payment transactions in the secure storage of the payment terminal and determining that the quantity of payment transactions is not 0, determining, by the payment terminal, that there is valid verification information in the secure storage.

Optionally, before the notifying, by the payment terminal, the settlement terminal that the CVM supported by the payment card is "no CVM required", the method further includes: obtaining, by the payment terminal, a terminal transaction attribute of the settlement terminal, where the terminal transaction attribute indicates a CVM method supported by the settlement terminal; and determining, by the payment terminal according to the terminal transaction attribute, that the settlement terminal does not support a consumer device cardholder verification method CD-CVM.

According to the foregoing method, whether the settlement terminal supports the CD-CVM may be determined in advance according to the terminal transaction attribute of the settlement terminal, so that when it is determined that the settlement terminal does not support the CD-CVM, the CVM supported by the currently used payment card may be changed to "no CVM required".

Optionally, the obtaining, by the payment terminal, a terminal transaction attribute of the settlement terminal includes: obtaining, by the payment terminal, the terminal transaction attribute of the settlement terminal by sending a processing options data object list PDOL to the settlement terminal, where the PDOL is sent by the payment terminal after the payment terminal receives a select application identifier SELECT AID command sent by the settlement terminal; or obtaining, by the payment terminal, the terminal transaction attribute of the settlement terminal by scanning a QR code that includes a uniform resource locator URL used to obtain the terminal transaction attribute of the settlement terminal; or obtaining, by the payment terminal, the terminal transaction attribute of the settlement terminal by receiving a Bluetooth low energy BLE broadcast message.

Optionally, after the notifying, by the payment terminal, the settlement terminal that the CVM supported by the payment card is "no CVM required", the method further includes: receiving, by the payment terminal, a transaction success notification pushed by the cloud verification server, and marking, in a transaction log, a type of the payment transaction as a downgraded CVM transaction; and synchronizing, by the payment terminal, the transaction log to the cloud verification server.

An embodiment of this application provides a payment verification apparatus, where the apparatus includes: a processing unit, configured to: if detecting that there is valid verification information in a secure storage, change a cardholder verification method CVM supported by a currently used payment card to "no CVM required", where the payment card is a preset card or a card selected by a user, and the secure storage is a trusted storage area in a trusted execution environment TEE or a secure storage area in a rich execution environment REE; and a transceiver unit, configured to notify the settlement terminal that the CVM supported by the payment card is "no CVM required", so that the settlement terminal performs verification on the user and completes a transaction according to "no CVM required".

Optionally, the processing unit is further configured to: if detecting that there is no valid verification information in the secure storage, send, to a cloud verification server, a verification request that includes a verification parameter; and the transceiver unit is further configured to receive verification information returned by the cloud verification server, where the verification information is generated and sent after verification performed by the cloud verification server on the verification parameter succeeds.

Optionally, the transceiver unit is further configured to: receive first identity verification data, and determine that the first identity verification data matches second identity verification data that is stored in the secure storage.

Optionally, the verification information includes a validity period parameter; the validity period parameter is a preset validity time that is set by the cloud verification server, and the verification information is valid within the preset validity time; and the processing unit is specifically configured to: if detecting that there is the verification information in the secure storage and determining that a preset validity time corresponding to the verification information does not expire, determine that there is valid verification information in the secure storage.

Optionally, the verification information is a quantity of payment transactions that is set by the cloud verification server, the quantity of payment transactions is decreased by 1 each time the payment terminal performs a successful payment transaction by using the payment card, and the quantity of payment transactions is valid when not being 0; and the processing unit is specifically configured to: if detecting that there is the quantity of payment transactions in the secure storage and determining that the quantity of payment transactions is not 0, determine that there is valid verification information in the secure storage.

Optionally, the transceiver unit is further configured to: obtain a terminal transaction attribute of the settlement terminal, where the terminal transaction attribute indicates a CVM method supported by the settlement terminal; and determine, according to the terminal transaction attribute, that the settlement terminal does not support a consumer device cardholder verification method CD-CVM.

Optionally, the transceiver unit is specifically configured to: obtain the terminal transaction attribute of the settlement terminal by sending a processing options data object list PDOL to the settlement terminal, where the PDOL is sent by the apparatus after the apparatus receives a select application identifier SELECT AID command sent by the settlement terminal; or obtain the terminal transaction attribute of the settlement terminal by scanning a QR code that includes a uniform resource locator URL used to obtain the terminal transaction attribute of the settlement terminal; or obtain the terminal transaction attribute of the settlement terminal by receiving a Bluetooth low energy BLE broadcast message.

Optionally, the transceiver unit is further configured to: receive a transaction success notification pushed by the cloud verification server, and mark, in a transaction log, a type of the payment transaction as a downgraded CVM transaction; and synchronize the transaction log to the cloud verification server.

An embodiment of this application provides a payment terminal, including a processor and a near field communication NFC module, where the processor is configured to: if detecting that there is valid verification information in a secure storage of the payment terminal, change a cardholder verification method CVM supported by a currently used payment card to "no CVM required", where the payment card is a preset card or a card selected by a user, and the secure storage of the payment terminal is a trusted storage area in a trusted execution environment TEE or a secure storage area in a rich execution environment REE; and the NFC module is configured to notify the settlement terminal that the CVM supported by the payment card is "no CVM required", so that the settlement terminal performs verification on the user and completes a transaction according to "no CVM required".

Optionally, the payment terminal further includes a transceiver and a Wi-Fi module; the processor is further configured to: if detecting that there is no valid verification information in the secure storage, send, to a cloud verification server, a verification request that includes a verification parameter; and the transceiver or the Wi-Fi module is further configured to receive verification information returned by the cloud verification server, where the verification information is generated and sent after verification performed by the cloud verification server on the verification parameter succeeds.

Optionally, the payment terminal further includes the transceiver and the Wi-Fi module; the transceiver or the Wi-Fi module is configured to receive first identity verification data; and the processor is configured to determine that the first identity verification data matches second identity verification data that is stored in the secure storage.

Optionally, the verification information includes a validity period parameter; the validity period parameter is a preset validity time that is set by the cloud verification server, and the verification information is valid within the preset validity time; and the processor is specifically configured to: if detecting that there is the verification information in the secure storage and determining that a preset validity time corresponding to the verification information does not expire, determine that there is valid verification information in the secure storage.

Optionally, the verification information is a quantity of payment transactions that is set by the cloud verification server, the quantity of payment transactions is decreased by 1 each time the payment terminal performs a successful payment transaction by using the payment card, and the quantity of payment transactions is valid when not being 0; and the processor is specifically configured to: if detecting that there is the quantity of payment transactions in the secure storage and determining that the quantity of payment transactions is not 0, determine that there is valid verification information in the secure storage.

Optionally, the NFC module is further configured to: obtain a terminal transaction attribute of the settlement terminal, where the terminal transaction attribute indicates a CVM method supported by the settlement terminal; and the processor is further configured to determine, according to the terminal transaction attribute, that the settlement terminal does not support a consumer device cardholder verification method CD-CVM.

Optionally, the payment terminal further includes a Bluetooth module and an image acquisition module; and the payment terminal obtains the terminal transaction attribute of the settlement terminal by sending, by using the NFC module, a processing options data object list PDOL to the settlement terminal, where the PDOL is sent by the payment terminal after the payment terminal receives a select application identifier SELECT AID command sent by the settlement terminal; or the payment terminal obtains the terminal transaction attribute of the settlement terminal by scanning, by using the image acquisition module, a QR code that includes a uniform resource locator URL used to obtain the terminal transaction attribute of the settlement terminal; or the payment terminal obtains the terminal transaction attribute of the settlement terminal by receiving, by using the Bluetooth module, a Bluetooth low energy BLE broadcast message.

Optionally, the payment terminal further includes the transceiver and the Wi-Fi module, and the transceiver or the Wi-Fi module is configured to: receive a transaction success notification pushed by the cloud verification server, and mark, in a transaction log, a type of the payment transaction as a downgraded CVM transaction; and synchronize the transaction log to the cloud verification server.

DETAILED DESCRIPTION OF ILLUSTRATIVE EMBODIMENTS

The following describes embodiments of this application in detail with reference to accompanying drawings of this specification.

In the embodiments of this application, a payment terminal may be a wireless terminal. For example, the payment terminal may be a mobile phone, a computer, a tablet computer, a personal digital assistant (PDA for short), a mobile Internet device (MID for short), a wearable device, an e-book reader, or the like.

In the embodiments of this application, a settlement terminal may be a contactless POS terminal, or another device that has a function of a contactless POS terminal.

Using a payment terminal that has a contactless communications interface (for example, an NFC (Near Field Communication, near field communication) interface) and an SE (Secure Element, secure element) may simulate a physical card to perform a contactless payment. This function is referred to as a card emulation (Card Emulation, CE) function. The payment terminal needs to store, in the SE, card data (for example, a primary account number of a user, a validity period, or a card key) simulated by the payment terminal. In recent years, in order to promote a contactless payment (for example, an NFC payment), Google adds support for host-based card emulation (Host-based Card Emulation, HCE) in an Android system, so that a bank or a third-party payment organization can more easily develop and deploy a payment application that uses the contactless communications interface of the payment terminal. Being different from storing the card data in the SE, the HCE generally stores payment-related data in a cloud, that is, a payment platform. After obtaining account data stored in the cloud, an application running in the Android system may simulate a physical card by using a CPU (Central Processing Unit, central processing unit) of the payment terminal to complete a contactless payment. To ensure information security for an HCE payment application, generally, a number or pattern lock password may be set for a payment application. To enter the HCE payment application, the user needs to provide a decoding lock. In addition, to prevent fraud, when using the card simulated by the payment terminal to perform the contactless payment, the bank also needs to perform cardholder verification, for example, entering a PIN code or providing a signature. As a result, the HCE application requires that the PIN code be entered twice, and excellent experience of the contactless payment is degraded.

In the embodiments of this application, the payment terminal has the contactless communications interface (for example, the near field communication NFC interface), the HCE application may be installed on the payment terminal, and the payment terminal may further include a TEE (Trust Execution Environment, trusted execution environment) and an REE (Rich Execution Environment, rich execution environment). A main service logic of the HCE application runs in the REE.

Figure 1:
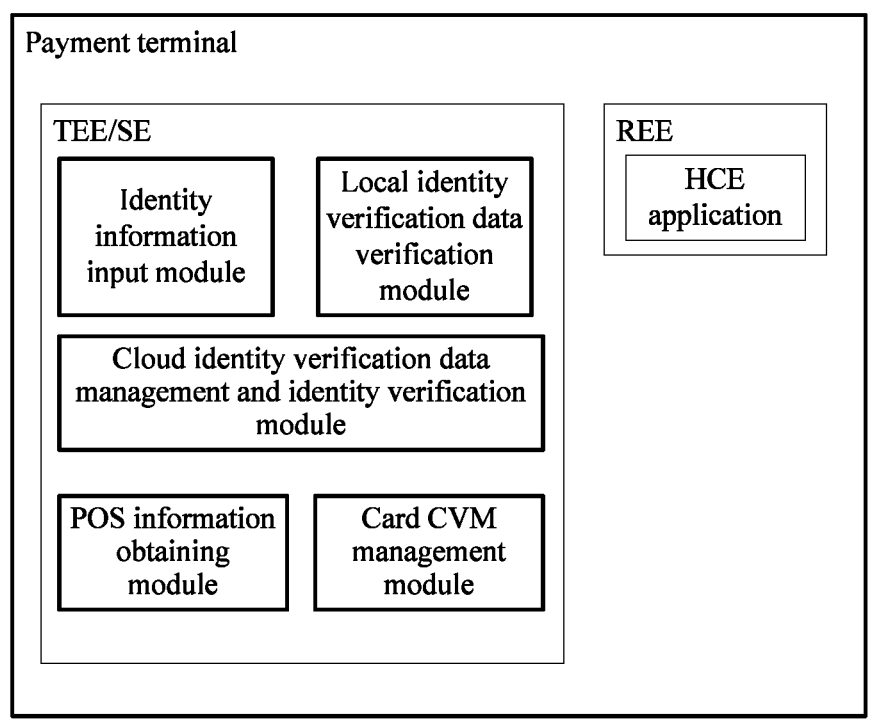
FIG. 1 is a schematic diagram of a system structure of a payment terminal according to an embodiment of this application.

Specifically, as shown in FIG. 1, FIG. 1 is a schematic diagram of a system structure of a payment terminal according to an embodiment of this application. In FIG. 1, the payment terminal includes an identity verification data input module, a local identity verification data verification module, a cloud identity verification data management module, a POS information obtaining module (not mandatory), and a card CVM management module. Preferably, the foregoing modules are implemented in a TEE.

The identity verification data input module is configured to provide a user with an input interface for entering identity verification data such as a PIN, a signature, or a fingerprint, and may be implemented by using a trusted user interface (Trusted User Interface, TUI).

The local identity verification data verification module is configured to perform local verification on the identity verification data such as the PIN, the signature, or the fingerprint entered by the user.

The cloud identity verification data management module is configured to manage verification information that is stored in a trusted storage in the TEE. The verification information is obtained in a manner in which the payment terminal submits, to a cloud verification server, an identity verification request that includes a verification parameter. The verification information may include a validity period parameter. The verification information may be an access token (an access token), a quantity of payment transactions that is set by the cloud verification server, or the like. After the user enters the identity verification data and local identity verification succeeds, a user program may access a storage area of the user program in the trusted storage in the TEE, obtain verification information that is stored in the storage area, and check a validity period of the verification information. If the verification information is invalid, the user program may further obtain user data (for example, an account and a password of the user program, or a primary account number, a validity period, or a cardholder telephone number of a card bound to the user program) that is stored in the trusted storage in the TEE, and send the verification request to the cloud verification server, to re-obtain verification information.

The POS information obtaining module is configured to obtain description information and/or a terminal transaction attribute of a POS terminal, for example, description information such as a merchant number, a POS terminal number, or acquiring bank information, and/or terminal transaction attribute information such as a CVM method supported by a POS terminal.

The card CVM management module is configured to manage a CVM list of a card simulated by the payment terminal. The payment terminal has a capability of simulating multiple payment cards. Each payment card has a CVM list. Each CVM list may include one or more CVMs.

For example, a CVM list of a payment card may be shown in Table 1.

TABLE 1

| CVM code | CVM |
|---|---|
| 0100 0010 0000 0011 | Online PIN |
| 0100 0001 0000 0011 | Offline PIN |
| 0001 1110 0000 0011 | Signature |
| 0001 1111 0000 0000 | "No CVM required" |

It should be noted that "no CVM required" is a special CVM and has a lowest security level. When performing a payment transaction, if determining that a verification method supported by a payment card is "no CVM required", the settlement terminal directly determines that cardholder verification succeeds, and does not need to perform cardholder verification again. Generally, when a transaction amount is less than a preset value, this method may be used. This can increase a transaction speed and improve transaction experience of the user.

Figure 2:
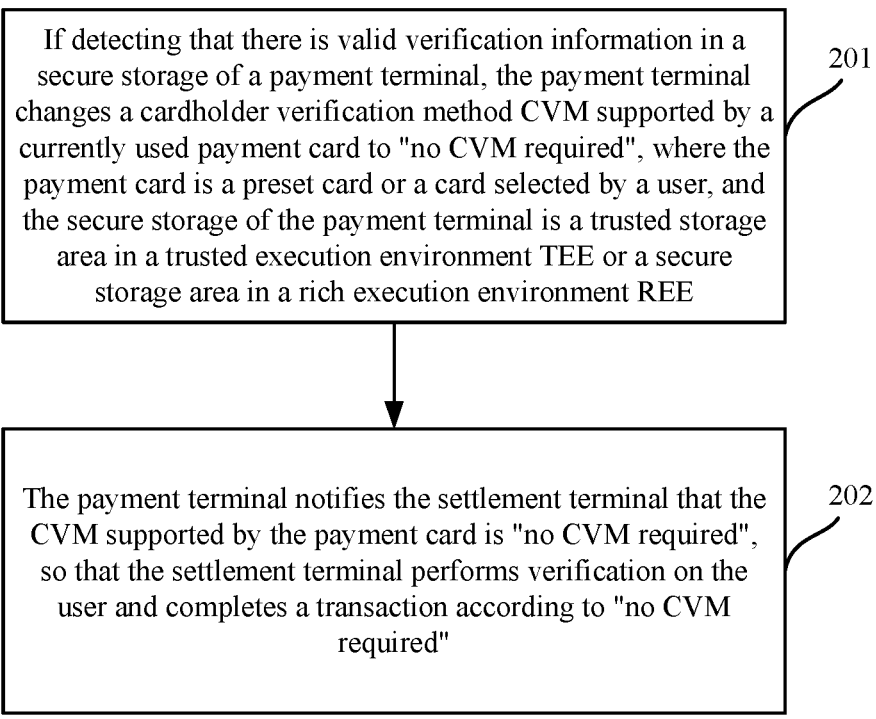
FIG. 2 is a schematic flowchart of a payment verification method according to an embodiment of this application.

Based on the foregoing description, as shown in FIG. 2, FIG. 2 is a schematic flowchart of a payment verification method according to an embodiment of this application.

As shown in FIG. 2, the method specifically includes the following steps:

Step 201: If detecting that there is valid verification information in a secure storage of a payment terminal, the payment terminal changes a cardholder verification method CVM supported by a currently used payment card to "no CVM required", where the payment card is a preset card or a card selected by a user, and the secure storage of the payment terminal is a trusted storage area in a trusted execution environment TEE or a secure storage area in a rich execution environment REE.

Step 202: The payment terminal notifies the settlement terminal that the CVM supported by the payment card is "no CVM required", so that the settlement terminal performs verification on the user and completes a transaction according to "no CVM required".

Before step 201, the payment terminal receives a request of starting an HCE application from the user. In this case, the payment terminal prompts the user to enter first identity verification data, so as to enter an HCE application interface after local identity verification succeeds. The first identity verification data received by the payment terminal includes but is not limited to a fingerprint, a PIN, a sound (a voiceprint), a signature, or an iris image.

With reference to FIG. 1, the payment terminal may receive, by using an identity verification data input module, the first identity verification data entered by the user.

After obtaining the first identity verification data entered by the user, the payment terminal may perform local verification on the first identity verification data entered by the user. With reference to FIG. 1, the payment terminal may perform, by using a local identity verification data verification module, verification on the first identity verification data entered by the user.

For example, the payment terminal may compare the first identity verification data entered by the user with second identity verification data that is stored in the secure storage of the payment terminal. If determining that the first identity verification data entered by the user matches the second identity verification data that is stored in the secure storage of the payment terminal, the payment terminal determines that verification on the first identity verification data succeeds; otherwise, the payment terminal determines that verification on the first identity verification data fails.

After determining that the verification on the first identity verification data succeeds, the payment terminal responds to the request of starting an HCE application from the user, and enters the HCE application interface. The user selects a payment card from a list of available cards (certainly, the HCE application may also directly use a default card as the payment card). Then, the payment terminal detects, in the trusted storage area in the TEE, whether there is valid verification information corresponding to the payment card that is being used by the HCE application. The verification information is managed by a cloud identity verification data management module. After detecting that there is the valid verification information, the payment terminal performs step 201.

In step 201, the payment card may be a virtual card generated by binding a card, such as a debit card or a credit card, to the payment terminal. Multiple payment cards may be bound to one HCE application. This is not limited in this embodiment of this application.

In this embodiment of this application, the verification information may include a validity period parameter, where the validity period parameter may be a validity time preset by a cloud verification server, and the verification information is valid within the preset validity time. The verification information may alternatively be a quantity of payment transactions that is set by the cloud verification server, where the quantity of payment transactions is decreased by 1 each time the payment terminal performs a successful payment transaction by using the payment card, and the quantity of payment transactions is valid when not being 0.

It should be noted that when the verification information is the quantity of payment transactions, the quantity of payment transactions is associated with an identifier of the HCE application and/or a payment card bound to the HCE application, that is, one HCE application and/or a payment card bound to the HCE application is corresponding to one quantity of payment transactions.

If detecting that there is the verification information in the secure storage of the payment terminal and determining that a preset validity time corresponding to the verification information does not expire, the payment terminal determines that there is valid verification information in the secure storage; or, if detecting that there is the quantity of payment transactions in the secure storage of the payment terminal and determining that the quantity of payment transactions is not 0, the payment terminal determines that there is valid verification information in the secure storage.

For example, in a scenario in which the payment terminal requests verification information from the cloud verification server by using an OAuth protocol, the verification information is an access token, and a validity period parameter of the access token may be a preset validity time. After determining that the verification on the first identity verification data succeeds, the payment terminal responds to the request of starting an HCE application from the user, and then detects, according to the identifier of the HCE application and/or an identifier of a payment card currently used by the HCE application, whether there is a valid access token in the payment terminal, where the access token is associated with the identifier of the HCE application and/or the identifier of the payment card currently used by the HCE application. If the access token exists and a preset validity time of the access token does not expire, the payment terminal determines that there is valid verification information, and executes a procedure that follows step 201.

For another example, the verification information is a quantity of payment transactions that is associated with a payment card, a mark of the quantity of payment transactions is stored in the TEE, and the quantity of payment transactions is decreased by 1 each time the payment terminal performs a successful contactless payment transaction. After determining that the verification on the first identity verification data succeeds, the payment terminal responds to the request of starting an HCE application from the user, and then determines whether the quantity of payment transactions in the payment terminal is 0. If the quantity of payment transactions in the payment terminal is not 0, the payment terminal determines that there is valid verification information, and executes a procedure that follows step 201.

Optionally, in this embodiment of this application, if detecting that there is no valid verification information in the secure storage of the payment terminal, the payment terminal sends, to the cloud verification server, a verification request that includes a verification parameter; and the payment terminal receives verification information returned by the cloud verification server, where the verification information is generated and sent after cardholder identity verification performed by the cloud verification server according to the verification parameter succeeds.

The verification parameter may be an identifier of the payment terminal, an account number and a password of the HCE application, and a refresh token corresponding to a current access token, or may be a primary account number, a validity period, a contact telephone number, or the like of a card bound to the HCE application This is specifically determined according to an actual situation.

With reference to the foregoing description, optionally, if the payment terminal determines that the access token does not exist, the cloud identity verification information management module in the TEE sends the identifier of the HCE application and the account and the password of the HCE application to the cloud verification server, to request an authorization code (Authorization Code) from the cloud verification server. Then, the HCE application sends the authorization code, the identifier of the HCE application, and the account of the HCE application to the cloud verification server by using the verification request, to request the cloud verification server to deliver an access token and a refresh token after the cloud verification server verifies that the authorization code is valid. If the access token exists, the payment terminal checks whether the preset validity time of the access token expires. If the preset validity time of the access token expires but a refresh token (Refresh Token) corresponding to the access token is valid, the HCE application sends the account of the HCE application and the refresh token to the cloud verification server by using the verification request, to request an access token from the cloud verification server.

It should be noted that, the authorization code is associated with the HCE application, and the HCE application may apply for the access token by using the authorization code associated with the HCE application, the identifier of the HCE application, and the account of the HCE application. When performing a payment transaction by using the HCE application, the user needs to obtain specific transaction permission, so that the HCE application completes the transaction by using a payment card. Permission required by the HCE application needs to be authorized by an access token. The access token is time-limited, to prevent the HCE application from permanently retaining the permission. To avoid a case in which the user needs to constantly re-apply, in a manner of using the authorization code, the identifier of the HCE application, and the account of the HCE application, for an access token for the HCE application when the access token is invalid, the refresh token that is associated with the access token may be used to re-apply for the access token when the access token is invalid. For specific content of the authorization code, the access token, and the refresh token, reference may be made to a stipulation in an OAuth 2.0 protocol, and details are not described herein.

For another example, if determining that the quantity of payment transactions is 0, the payment terminal sends, by using the verification request to the cloud verification server, a primary account number, a validity period, a cardholder telephone number, or the like that is of a card bound to a user program and that is obtained according to the first identity verification data entered by the user, to request verification information from the cloud verification server, that is, a quantity of payment transactions that is not 0.

It should be noted that the cloud verification server may be an issuing bank server corresponding to the payment card. In this embodiment of this application, the payment terminal may communicate with the cloud verification server by using a Wi-Fi module, or may communicate with the cloud verification server by using a mobile communications module (for example, a communications module such as a 2G module, a 3G module, or a 4G module). The payment terminal communicates with the settlement terminal by using a contactless communications module, for example, an NFC module.

Optionally, after detecting that there is valid verification information in the secure storage of the payment terminal, and before changing the cardholder verification method CVM supported by the currently used payment card to "no CVM required", the payment terminal may first determine a payment amount to be paid in a current payment transaction. If determining that the payment amount is less than a preset threshold, the payment terminal performs the step of changing the cardholder verification method CVM supported by the currently used payment card to "no CVM required"; if determining that the payment amount is greater than or equal to a preset threshold, the payment terminal changes the cardholder verification method CVM supported by the currently used payment card to a verification method such as using an online PIN or a signature.

In this embodiment of this application, the payment terminal may change, in the following manner, the cardholder verification method CVM supported by the currently used payment card to "no CVM required".

The payment terminal may set the fifth bit of a first byte in an AIP (Application Interchange Profile, application interchange profile) of the payment card to 1 to indicate that the payment card supports cardholder verification, initialize a CVM list of the payment card, and set "no CVM required" to be the first entry in the CVM list supported by the card; or set the CVM list to a CVM list including only an "no CVM required" entry. In this way, the cardholder verification method CVM supported by the currently used payment card is changed to "no CVM required".

Optionally, in this embodiment of this application, before performing step 202, the payment terminal may first obtain a terminal transaction attribute of the settlement terminal, where the terminal transaction attribute indicates a CVM method supported by the settlement terminal. After determining, according to the terminal transaction attribute, that the settlement terminal does not support a CD-CVM, the payment terminal may perform step 202.

Certainly, the foregoing is only an optional step. The payment terminal may alternatively perform step 202 after determining that the settlement terminal supports the CD-CVM, or directly perform step 202 without determining whether the settlement terminal supports the CD-CVM.

With reference to FIG. 1, the payment terminal may obtain, by using a POS information obtaining module, the terminal transaction attribute of the settlement terminal, further determine whether the settlement terminal supports the CD-CVM, and when the settlement terminal does not support the CD-CVM, perform step 202.

In this embodiment of this application, the payment terminal may obtain the terminal transaction attribute of the settlement terminal in multiple manners, which are described below in detail.

In a first possible implementation, in a process in which the settlement terminal communicates with the payment terminal to select an application, the payment terminal may obtain the terminal transaction attribute of the settlement terminal by sending a PDOL (Processing Data Object List, processing options data object list) to the settlement terminal. Specifically, when responding to, by using the contactless communications module, a select application identifier (SELECT AID) command sent by the settlement terminal, the payment terminal sets a tag "9F66" in a PDOL of a response message, to indicate that the settlement terminal needs to provide the payment terminal with the terminal transaction attribute of the settlement terminal. Then, the payment terminal receives, by using the contactless communications module, a GPO (Get Processing Option, get processing option) command sent by the settlement terminal, where the GPO command includes the terminal transaction attribute that is indicated in the PDOL and that the settlement terminal is required to provide. The settlement terminal may use the first bit in a first byte or a reserved bit in a second or a third byte in the terminal transaction attribute of the settlement terminal to indicate whether the settlement terminal supports the CD-CVM. For a conventional terminal that does not support the CD-CVM, the foregoing bits should be initialized and set to 0.

It should be noted that because the payment terminal simulates the payment card by using an HCE technology, the payment terminal cannot proactively send a message to the settlement terminal, and can send a request to the settlement terminal only after receiving, when entering an electromagnetic field range of the settlement terminal, a command that is sent by the settlement terminal to the payment terminal by using a contactless module, and when answering the command sent by the settlement terminal.

Figure 3:
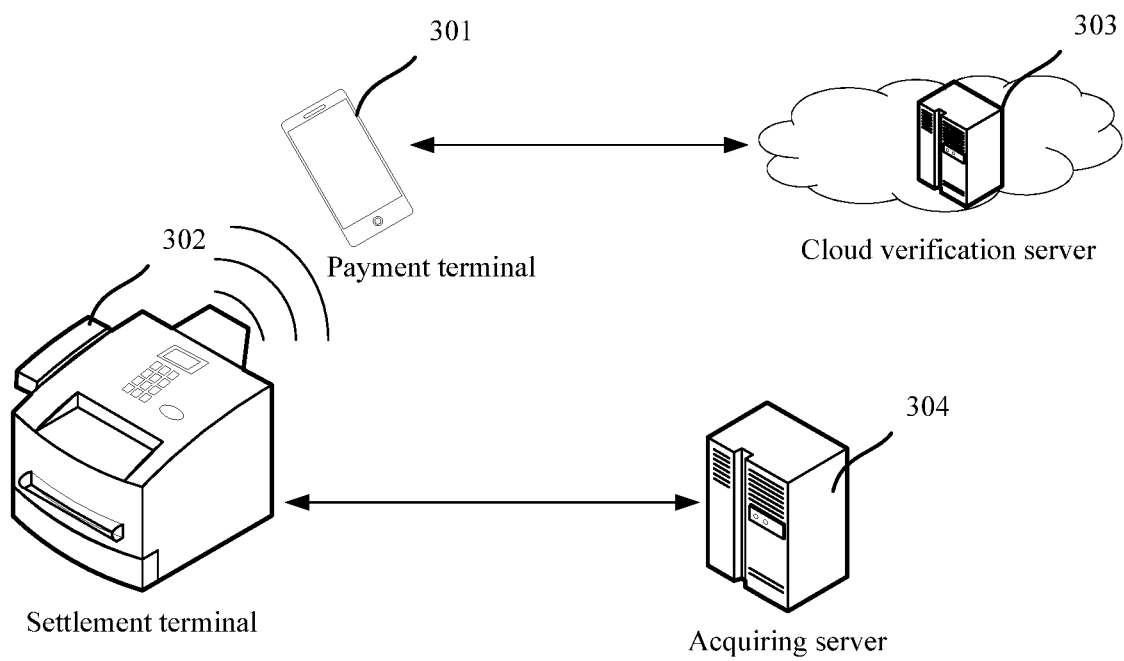
FIG. 3 is a schematic diagram of a payment transaction according to an embodiment of this application.

For example, as shown in FIG. 3, FIG. 3 is a schematic diagram of a payment transaction according to an embodiment of this application. In FIG. 3, a payment terminal 301 receives a request of starting an HCE application in the payment terminal 301 from a user. In this case, the payment terminal 301 prompts the user to enter first identity verification data, and after determining that verification on the first identity verification data succeeds, determines a payment card in the HCE application. Then, the payment terminal detects, in a trusted storage area in a TEE, whether there is valid verification information corresponding to the payment card that is being used by the HCE application. If detecting that there is no valid verification information in a secure storage of the payment terminal 301, the payment terminal 301 sends, to a cloud verification server 303, a verification request that includes a verification parameter. After verification performed by the cloud verification server 303 on the verification parameter succeeds, the cloud verification server 303 returns new verification information to the payment terminal 301. In this case, the payment terminal 301 changes a CVM supported by the currently used payment card to "no CVM required". After getting close to a settlement terminal 302, the payment terminal 301 senses an electromagnetic signal of the settlement terminal 302, to receive, by using a contactless communications module of the payment terminal, a transaction command sent by the settlement terminal 302. The payment terminal 301 responds to the transaction command from the settlement terminal 302, and notifies the settlement terminal 302 that the CVM supported by the currently used payment card is "no CVM required". After determining that the CVM supported by the payment card currently used by the payment terminal 301 is "no CVM required", the settlement terminal 302 determines that cardholder verification succeeds, and sends a transaction request to an acquiring server 304 of an acquirer. The transaction request sent by the settlement terminal 302 to the acquiring server 304 includes information such as an account number and a transaction amount of the payment card. After receiving a transaction authorization notification message returned by the acquiring server 304, the settlement terminal 302 determines that the payment transaction is completed.

In a second possible implementation, the payment terminal obtains the terminal transaction attribute of the settlement terminal by scanning a QR code that includes a URL (Uniform Resource Locator, uniform resource locator) used to obtain the terminal transaction attribute of the settlement terminal. In an environment in which a settlement terminal is deployed, such as a shopping mall or a supermarket, a settlement terminal manager may proactively provide a QR code. When a user scans the QR code by using a payment terminal, the payment terminal may access a URL, may obtain a terminal transaction attribute of the settlement terminal by using the URL, and further determine whether the settlement terminal supports a CD-CVM. The payment terminal may further obtain description information of the settlement terminal, such as a merchant number or a terminal number, by accessing the URL.

In a third possible implementation, the payment terminal obtains the terminal transaction attribute of the settlement terminal by receiving a BLE (Bluetooth Low Energy, Bluetooth low energy) broadcast message. In an environment in which a settlement terminal is deployed, such as a shopping mall or a supermarket, a settlement terminal manager may deploy BLE broadcasting to push information related to an advertisement and a payment, for example, a CVM manner supported by the settlement terminal. The BLE broadcast message may be sent by the settlement terminal, or may be sent by another terminal. After receiving the BLE broadcast message, a payment terminal may parse the BLE broadcast message to obtain a terminal transaction attribute of the settlement terminal, and further determine whether the settlement terminal supports a CD-CVM. The payment terminal may further obtain description information of the settlement terminal, such as a merchant number or a terminal number, by parsing the BLE broadcast message.

In step 202, after the payment terminal receives the GPO command sent by the settlement terminal, the payment terminal sends, to the settlement terminal, a response message that includes the AIP. Then, when the settlement terminal reads application data by using a READ RECORD (read record) command, the payment terminal responds to the settlement terminal by using an adjusted CVM method list. After reading the CVM list, the settlement terminal determines, according to the first entry in the CVM list, that the cardholder verification method is "no CVM required", so as to determine that a cardholder verification procedure succeeds and execute a subsequent procedure of the payment transaction.

According to the foregoing method, after the payment terminal adjusts the CVM supported by the payment card to "no CVM required", the settlement terminal only needs to directly determine, according to "no CVM required", that the cardholder verification procedure succeeds, regardless of whether a cardholder verification method such as the CD-CVM is supported. Therefore, the user does not need to re-enter a PIN code to perform a cardholder verification operation, thereby simplifying a transaction process and improving transaction experience.

Optionally, the payment terminal may alternatively indicate, in a payment card verification result (Card Verification Result, CVR) part included in an issuing bank application data of the payment card, that cardholder verification performed by the payment terminal on the payment card has succeeded, so that the settlement terminal sends the CVR to an issuing bank, and simultaneously sets the CVM method supported by the payment card to using an online PIN. In this way, the user may enter any number or directly press OK on the settlement terminal. Then, the settlement terminal may determine that the cardholder verification succeeds, and continue to perform the transaction.

Optionally, the payment terminal may receive a transaction success notification sent by the settlement terminal or the cloud verification server, and mark, in a transaction log, a type of the payment transaction as a downgraded CVM transaction. The payment terminal may further add description information of the settlement terminal, such as a merchant number or a terminal number, in a record in which the type of the payment transaction is marked as the downgraded CVM transaction.

Further, the payment terminal may synchronize the transaction log to the cloud verification server.

The following describes the foregoing process by using a specific embodiment.

Figure 4:
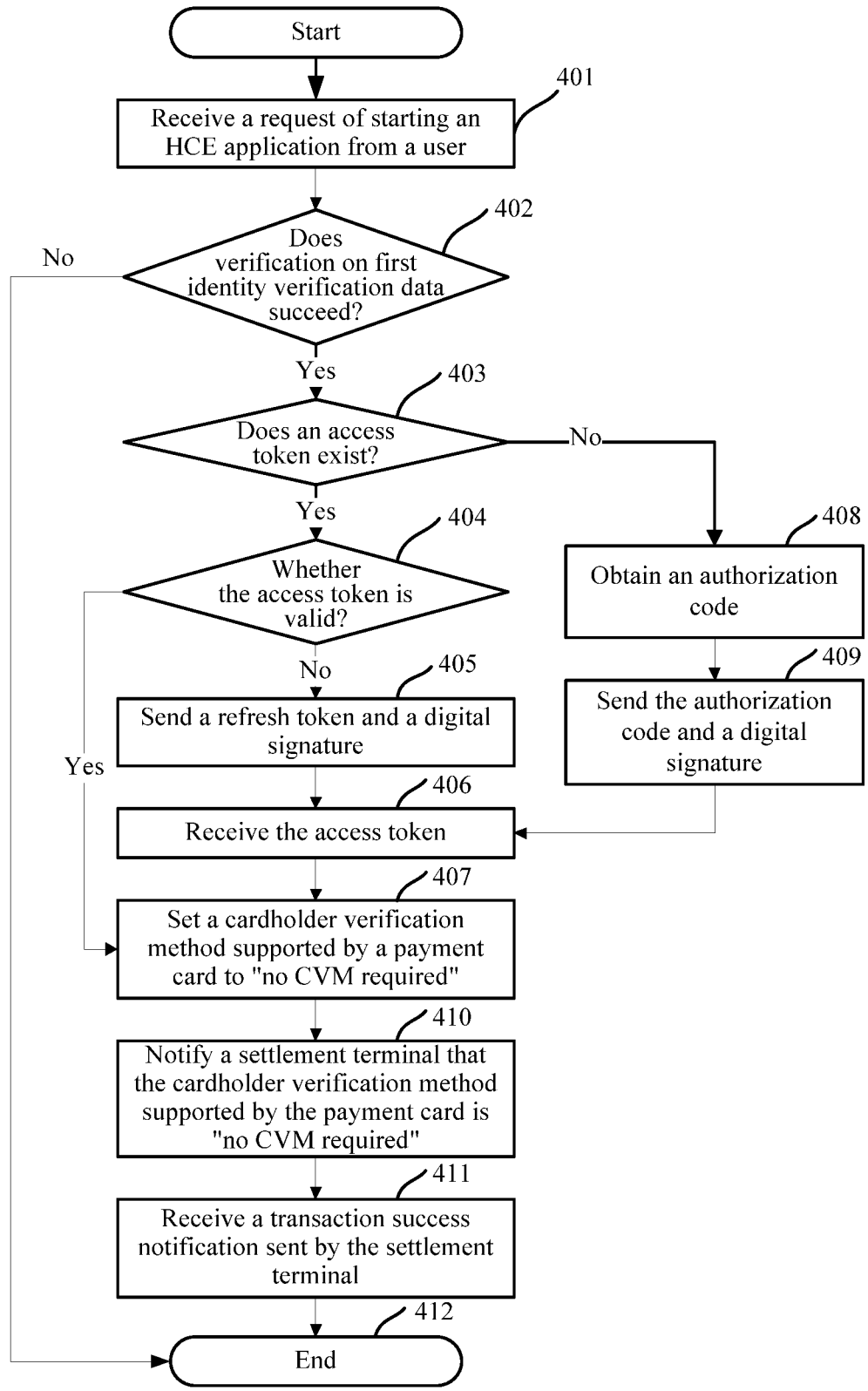
FIG. 4 is a schematic diagram of a payment transaction process according to an embodiment of this application.

As shown in FIG. 4, FIG. 4 is a schematic diagram of a payment transaction process according to an embodiment of this application.

FIG. 4 shows a process of a payment transaction that is performed in a scenario in which an OAuth 2.0 protocol is used to obtain verification information, where the verification information is an access token.

Step 401: A payment terminal receives a request of starting an HCE application from a user. Then, the payment terminal displays an interface for entering first identity verification data, and prompts the user to enter identity verification data. The input interface may be implemented by using a TUI.

Step 402: The payment terminal receives the first identity verification data entered by the user, and performs local verification on the first identity verification data. If verification on the first identity verification data succeeds, step 403 is performed; if verification on the first identity verification data fails, step 412 is performed.

Step 403: The payment terminal starts the HCE application, and detects, according to an identifier of the HCE application, whether there is an access token in the payment terminal, where the access token is associated with the identifier of the HCE application or with a payment card currently used by the HCE application. If the access token exists, step 404 is performed; if the access token does not exist, step 407 is performed.

Step 404: The payment terminal determines whether the access token is valid. If the access token is valid, step 409 is performed; if the access token is invalid, step 405 is performed.

The payment terminal checks a preset validity time of the access token. If the preset validity time does not exceed a validity period, the payment terminal determines that the access token is valid.

Step 405: The payment terminal obtains a refresh token that is corresponding to the access token, and the identifier of the payment card that is associated with the HCE application, and then sends the refresh token and account data of the HCE application, or send the refresh token and an identifier of the card currently used by the HCE application to a cloud verification server by using a verification request, to request a new access token from the cloud verification server.

An issuing bank server may use an access token to ensure that a payment amount accumulated within a specific period of time does not exceed a specific limit. A refresh token is used to apply for a new access token from the cloud verification server when a validity time of the access token has expired. In this case, the cloud verification server does not deliver a refresh token along with the access token. The payment terminal deletes the refresh token after receiving the new access token.

Step 406: The payment terminal receives the access token returned by the cloud verification server.

Step 407: The payment terminal sets a cardholder verification method supported by the payment card to "no CVM required", and step 410 is performed.

Specifically, the payment terminal may set the first entry in a CVM list supported by the payment card to "no CVM required", or set the CVM list to a CVM list including only a "no CVM required" entry.

Step 408: The payment terminal sends data such as the identifier of the HCE application and an account and a password of the HCE application to the cloud verification server by using a cloud verification information management module, to request an authorization code from the cloud verification server.

Step 409: The payment terminal receives the authorization code, and then the HCE application sends the identifier of the HCE application and the authorization code or an identifier of a card that is being used by the HCE application and the authorization code to the cloud verification server, to request an access token from the cloud verification server.

Step 410: After receiving a GPO command from a settlement terminal, the payment terminal notifies the settlement terminal that the CVM supported by the payment card is "no CVM required".

Specifically, the payment terminal notifies, by making a response to the GPO command sent by the settlement terminal, the settlement terminal that the payment card supports cardholder verification, and provides, by making a response to a READ RECORD command sent by the settlement terminal, the CVM list supported by the payment card to the settlement terminal. The settlement terminal receives the response, obtains the CVM list supported by the payment card, reads the first entry, determines that the payment card supports "no CVM required", and further determines that the cardholder verification succeeds, continues to process other data, and completes a payment transaction.

It should be noted that step 410 is performed when the user places the payment terminal close to the settlement terminal, so that the payment terminal senses an electromagnetic signal of the settlement terminal and performs a contactless payment transaction.

Step 411: The payment terminal may receive a transaction success notification sent by the settlement terminal or the cloud verification server, and mark, in a transaction log, a type of the payment transaction as a downgraded CVM transaction.

The transaction success notification is sent after the settlement terminal directly determines, after determining that the payment card supports "no CVM required", that the cardholder verification on the payment card succeeds. Because the settlement terminal directly determines, according to "no CVM required", that the cardholder verification on the payment card succeeds, a cardholder verification operation such as an operation in which the user needs to enter a PIN is avoided, thereby simplifying the transaction process and improving user experience.

Optionally, the payment terminal may further synchronize the transaction log to the cloud verification server.

Step 412: The entire transaction process ends.

Figure 5:
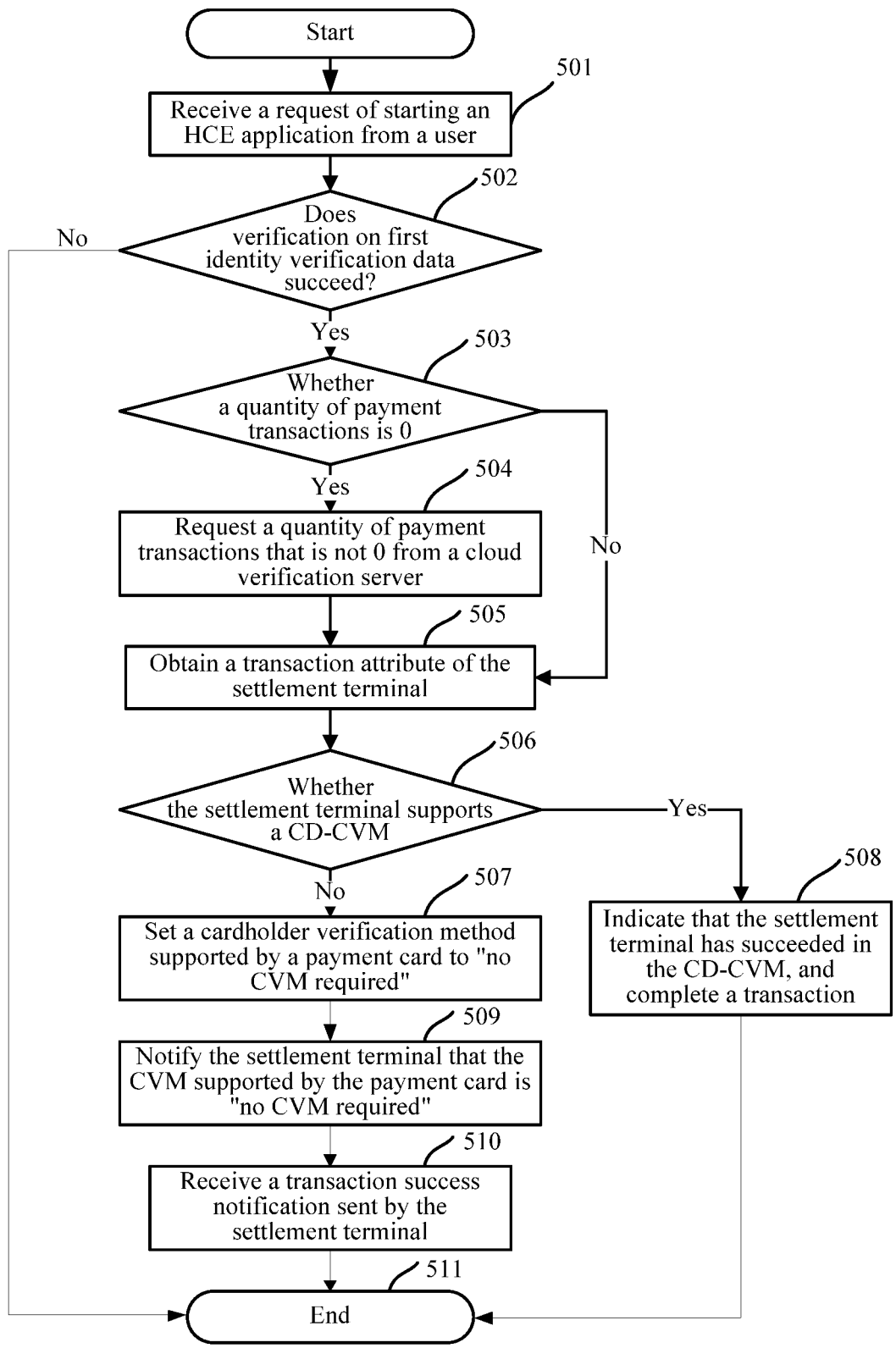
FIG. 5 is a schematic diagram of a payment transaction process according to an embodiment of this application.

As shown in FIG. 5, FIG. 5 is a schematic diagram of a payment transaction process according to an embodiment of this application.

In the payment transaction process shown in FIG. 5, verification information is a quantity of payment transactions.

Step 501: A payment terminal receives a request of starting an HCE application from a user.

Step 502: The payment terminal receives first identity verification data entered by the user, and performs local verification on the first identity verification data. If verification on the first identity verification data succeeds, step 503 is performed; if verification on the first identity verification data fails, step 511 is performed.

Step 503: The payment terminal starts the HCE application, and detects, in the payment terminal according to an identifier of the HCE application and/or a payment card bound to the HCE application, whether a quantity of payment transactions that is corresponding to a verification success mark associated with the HCE application is 0. If the quantity of payment transactions is 0, step 504 is performed; if the quantity of payment transactions is not 0, step 507 is performed.

Step 504: The payment terminal sends, to a cloud verification server, a verification request that includes a verification parameter, so that the cloud verification server returns a quantity limit of payment transactions that is not 0 after verification performed by the cloud verification server succeeds. The verification parameter may be an identifier of the payment terminal, or the verification parameter may be an identifier of the payment terminal and a primary account, a primary account validity period, a cardholder telephone number, or the like of the payment card. The verification server may set different limits on the quantity of payment transactions according to different verification parameters submitted by the payment terminal.

After receiving the quantity limit of payment transactions that is returned by the cloud verification server, the payment terminal resets a local verification success mark of the payment terminal.

Optionally, before step 504, the payment terminal may alternatively prompt the user to request a quantity of payment transactions that is not 0 from the cloud verification server, and receive input and confirmation operations from the user.

Step 505: The payment terminal obtains a terminal transaction attribute of the settlement terminal.

Specifically, the payment terminal may receive, by using a contactless communications module, a SELECT AID command sent by the settlement terminal, and then send, to the settlement terminal, a PDOL that includes a terminal transaction attribute query request field (that is, a tag "9F66"); then receive, by using the contactless communications module, a GPO command sent by the settlement terminal; determine the terminal transaction attribute of the settlement terminal according to the GPO command; and determine whether the settlement terminal supports a CD-CVM.

Certainly, the payment terminal may alternatively obtain the terminal transaction attribute of the settlement terminal by scanning a QR code, or the payment terminal may obtain the terminal transaction attribute of the settlement terminal by receiving a Bluetooth low energy BLE broadcast message. Details are not described herein again.

Step 506: The payment terminal determines, according to the terminal transaction attribute of the settlement terminal, whether the settlement terminal supports a CD-CVM. If the settlement terminal does not support the CD-CVM, step 507 is performed; if the settlement terminal supports the CD-CVM, step 508 is performed.

Step 507: The payment terminal sets a cardholder verification method supported by the payment card to "no CVM required", and step 509 is performed.

Specifically, the payment terminal may set the first entry in a CVM list supported by the payment card to "no CVM required", or set a CVM list supported by the payment card to a CVM list including only a "no CVM required" entry.

Step 508: The payment terminal indicates that the settlement terminal has executed the CD-CVM, and the settlement terminal determines that cardholder verification succeeds, continues to perform other processing, and completes a payment transaction.

The foregoing steps 505, 506, and 508 are optional steps.

Step 509: After receiving a query message from the settlement terminal, the payment terminal notifies the settlement terminal that the CVM supported by the payment card is "no CVM required". Specifically, the payment terminal receives an application data read command READ RECORD sent by the settlement terminal, and makes a response to the command by using the CVM list set in step 507, so that the settlement terminal may determine that the payment card supports "no CVM required" and determine that the cardholder verification succeeds.

Step 510: The payment terminal receives a transaction success notification sent by the settlement terminal or the cloud verification server, and marks, in a transaction log, a type of the payment transaction as a downgraded CVM transaction.

The transaction success notification is sent after the settlement terminal directly determines, after determining that the payment card supports "no CVM required", that the cardholder verification on the payment card succeeds. Because the settlement terminal directly determines, according to "no CVM required", that the cardholder verification on the payment card succeeds, a cardholder verification operation such as an operation in which the user needs to enter a PIN is avoided, thereby simplifying the transaction process and improving user experience.

Optionally, the payment terminal may further synchronize the transaction log to the cloud verification server.

Step 511: The entire transaction process ends.

Based on a same inventive concept, an embodiment of this application further provides a payment verification apparatus, where the apparatus may execute the foregoing method.

Figure 6:
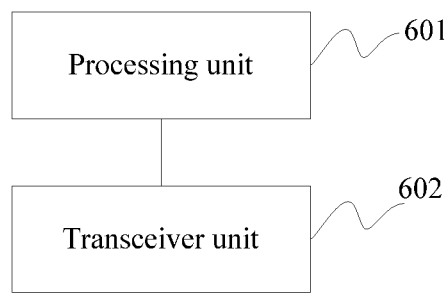
FIG. 6 is a schematic structural diagram of a payment verification apparatus according to an embodiment of this application.

As shown in FIG. 6, FIG. 6 is a schematic structural diagram of a payment verification apparatus according to an embodiment of this application.

Referring to FIG. 6, the apparatus includes:

a processing unit 601, configured to: if detecting that there is valid verification information in a secure storage, change a cardholder verification method CVM supported by a currently used payment card to "no CVM required", where the payment card is a preset card or a card selected by a user, and the secure storage is a trusted storage area in a trusted execution environment TEE or a secure storage area in a rich execution environment REE; and a transceiver unit 602, configured to notify the settlement terminal that the CVM supported by the payment card is "no CVM required", so that the settlement terminal performs verification on the user and completes a transaction according to "no CVM required".

Optionally, the processing unit 601 is further configured to:

if detecting that there is no valid verification information in the secure storage, send, to a cloud verification server, a verification request that includes a verification parameter; and the transceiver unit 602 is further configured to receive verification information returned by the cloud verification server, where the verification information is generated and sent after verification performed by the cloud verification server on the verification parameter succeeds.

Optionally, the transceiver unit 602 is further configured to:

receive first identity verification data, and determine that the first identity verification data matches second identity verification data that is stored in the secure storage.

Optionally, the verification information includes a validity period parameter;

the validity period parameter is a preset validity time that is set by the cloud verification server, and the verification information is valid within the preset validity time; and the processing unit 601 is specifically configured to:

if detecting that there is the verification information in the secure storage and determining that a preset validity time corresponding to the verification information does not expire, determine that there is valid verification information in the secure storage.

Optionally, the verification information is a quantity of payment transactions that is set by the cloud verification server, the quantity of payment transactions is decreased by 1 each time the payment terminal performs a successful payment transaction by using the payment card, and the quantity of payment transactions is valid when not being 0; and the processing unit 601 is specifically configured to:

if detecting that there is the quantity of payment transactions in the secure storage and determining that the quantity of payment transactions is not 0, determine that there is valid verification information in the secure storage.

Optionally, the transceiver unit 602 is further configured to:

obtain a terminal transaction attribute of the settlement terminal, where the terminal transaction attribute indicates a CVM method supported by the settlement terminal; and determine, according to the terminal transaction attribute, that the settlement terminal does not support a consumer device cardholder verification method CD-CVM.

Optionally, the payment terminal further includes a Bluetooth module and an image acquisition module; and the payment terminal obtains the terminal transaction attribute of the settlement terminal by sending, by using an NFC module, a processing options data object list PDOL to the settlement terminal, where the PDOL is sent by the payment terminal after the payment terminal receives a select application identifier SELECT AID command sent by the settlement terminal; or the payment terminal obtains the terminal transaction attribute of the settlement terminal by scanning, by using the image acquisition module, a QR code that includes a uniform resource locator URL used to obtain the terminal transaction attribute of the settlement terminal; or the payment terminal obtains the terminal transaction attribute of the settlement terminal by receiving, by using the Bluetooth module, a Bluetooth low energy BLE broadcast message.

Optionally, the transceiver unit 602 is further configured to:

receive a transaction success notification pushed by the cloud verification server, and mark, in a transaction log, a type of the payment transaction as a downgraded CVM transaction; and synchronize the transaction log to the cloud verification server.

Based on a same inventive concept, an embodiment of this application further provides a payment terminal, where the payment terminal may execute the foregoing method.

Figure 7:
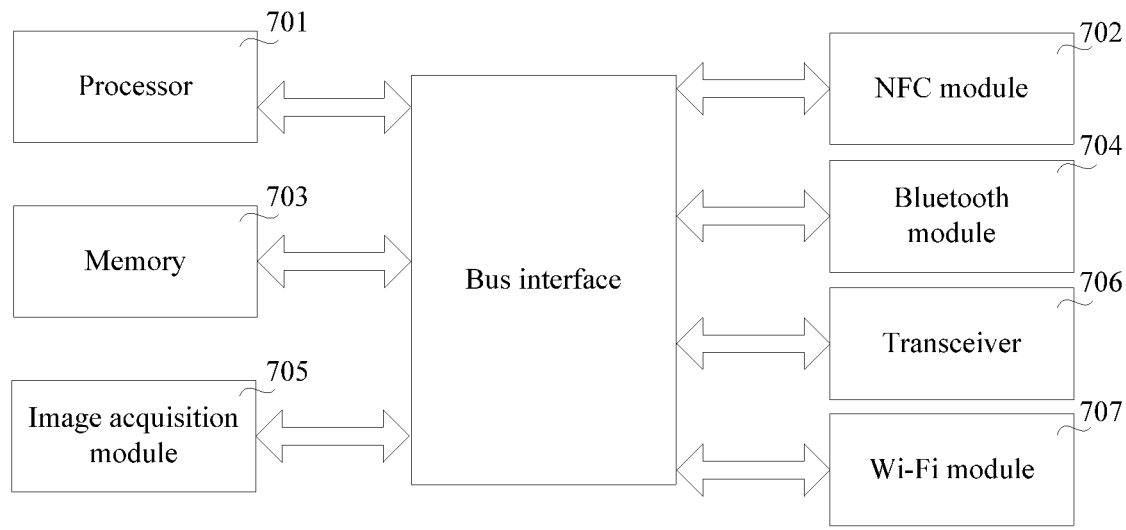
FIG. 7 is a schematic structural diagram of a payment terminal according to an embodiment of this application.

As shown in FIG. 7, FIG. 7 is a schematic structural diagram of a payment terminal according to an embodiment of this application.

Referring to FIG. 7, the payment terminal includes a processor 701, an NFC module 702, and a memory 703.

The processor 701 may be a central processing unit (CPU for short), a network processor (NP for short), or a combination of a CPU and an NP. The processor 701 may further include a hardware chip. The foregoing hardware chip may be an application-specific integrated circuit (ASIC for short), a programmable logic device (PLD for short), or a combination thereof. The foregoing PLD may be a complex programmable logic device (CPLD for short), a field-programmable logic gate array (FPGA for short), a generic array logic (GAL for short), or any combination thereof. The memory 703 may include a volatile memory such as a random access memory (RAM for short); or the memory 703 may include a non-volatile memory such as a read-only memory, a flash memory, a hard disk drive (HDD for short) or a solid-state drive (SSD for short); or the memory 703 may include a combination of the foregoing types of memories.

The memory 703 may be configured to store a computer instruction.

The processor 701 is configured to: if detecting that there is valid verification information in a secure storage of the payment terminal, change a cardholder verification method CVM supported by a currently used payment card to "no CVM required", where the payment card is a preset card or a card selected by a user, and the secure storage of the payment terminal is a trusted storage area in a trusted execution environment TEE or a secure storage area in a rich execution environment REE.

The NFC module 702 is configured to notify the settlement terminal that the CVM supported by the payment card is "no CVM required", so that the settlement terminal performs verification on the user and completes a transaction according to "no CVM required".

Optionally, the payment terminal further includes a transceiver 706 and a Wi-Fi module 707; the processor 701 is further configured to: if detecting that there is no valid verification information in the secure storage, send, to a cloud verification server, a verification request that includes a verification parameter; and the transceiver 706 or the Wi-Fi module 707 is further configured to receive verification information returned by the cloud verification server, where the verification information is generated and sent after verification performed by the cloud verification server on the verification parameter succeeds.

Optionally, the payment terminal further includes the transceiver 706 and the Wi-Fi module 707; the transceiver 706 or the Wi-Fi module 707 is configured to receive first identity verification data; and the processor 701 is configured to determine that the first identity verification data matches second identity verification data that is stored in the secure storage.

Optionally, the verification information includes a validity period parameter; the validity period parameter is a preset validity time that is set by the cloud verification server, and the verification information is valid within the preset validity time; and the processor 701 is specifically configured to: if detecting that there is the verification information in the secure storage and determining that a preset validity time corresponding to the verification information does not expire, determine that there is valid verification information in the secure storage.

Optionally, the verification information is a quantity of payment transactions that is set by the cloud verification server, the quantity of payment transactions is decreased by 1 each time the payment terminal performs a successful payment transaction by using the payment card, and the quantity of payment transactions is valid when not being 0; and the processor 701 is specifically configured to: if detecting that there is the quantity of payment transactions in the secure storage and determining that the quantity of payment transactions is not 0, determine that there is valid verification information in the secure storage.

Optionally, the NFC module 702 is further configured to: obtain a terminal transaction attribute of the settlement terminal, where the terminal transaction attribute indicates a CVM method supported by the settlement terminal; and the processor 701 is further configured to determine, according to the terminal transaction attribute, that the settlement terminal does not support a consumer device cardholder verification method CD-CVM.

Optionally, the payment terminal further includes a Bluetooth module 704 and an image acquisition module 705; and the payment terminal obtains the terminal transaction attribute of the settlement terminal by sending, by using the NFC module 702, a processing options data object list PDOL to the settlement terminal, where the PDOL is sent by the payment terminal after the payment terminal receives a select application identifier SELECT AID command sent by the settlement terminal; or the payment terminal obtains the terminal transaction attribute of the settlement terminal by scanning, by using the image acquisition module 705, a QR code that includes a uniform resource locator URL used to obtain the terminal transaction attribute of the settlement terminal; or the payment terminal obtains the terminal transaction attribute of the settlement terminal by receiving, by using the Bluetooth module 704, a Bluetooth low energy BLE broadcast message.

Optionally, the payment terminal further includes the transceiver 706 and the Wi-Fi module 707, and the transceiver 706 or the Wi-Fi module 707 is configured to: receive a transaction success notification pushed by the cloud verification server, and mark, in a transaction log, a type of the payment transaction as a downgraded CVM transaction; and synchronize the transaction log to the cloud verification server.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage channels (including but not limited to a disk memory, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine instruction, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
    detecting, by a payment terminal, first verification information in a secure storage of the payment terminal, the first verification information comprising a quantity of payment transactions, and the secure storage of the payment terminal being a trusted storage area in a trusted execution environment (TEE) or a secure storage area in a rich execution environment (REE);
    determining, by the payment terminal, whether the first verification information is valid, wherein determining whether the first verification information is valid comprises determining whether the quantity of payment transactions exceeds a threshold;
    sending, by the payment terminal to a cloud verification server, in response to determining that the first verification information is invalid, a verification request that comprises a verification parameter, wherein the verification parameter comprises a cardholder telephone number of a card bound to a user program of the payment terminal;
    receiving, by the payment terminal from the cloud verification server, second verification information, the second verification information having been generated and sent based on successful verification of the verification parameter;
    changing, by the payment terminal in response to determining that the second verification information is valid, a cardholder verification method (CVM) supported by a currently-used payment card to a no CVM required payment method, the currently-used payment card having been preset or selected by a user; and
    notifying, by the payment terminal, a settlement terminal that the CVM supported by the currently-used payment card is the no CVM required payment method, causing the settlement terminal to perform verification on the user and to complete a payment transaction according to the no CVM required payment method.

2. The method according to claim 1, further comprising:
    receiving, by the payment terminal, first identity verification data; and
    determining, by the payment terminal, that the first identity verification data matches second identity verification data stored in the secure storage of the payment terminal.

3. The method according to claim 1, wherein:
    the first verification information further comprises a validity period parameter indicating a time period during which the first verification information is valid;
    the validity period parameter is a preset validity time set by the cloud verification server; and determining whether the first verification information is valid further comprises:
   determining, by the payment terminal, whether the preset validity time corresponding to the first verification information has not expired.

4. The method according to claim 1, wherein:
the quantity of payment transactions has been set by the cloud verification server;
the threshold is equal to zero; and
the method further comprises:
   decrementing, by the payment terminal in response to the payment terminal performing a successful payment transaction using the currently-used payment card, the quantity of payment transactions by one.

5. The method according to claim 1, further comprising:
obtaining, by the payment terminal, a terminal transaction attribute of the settlement terminal, the terminal transaction attribute indicating a CVM method supported by the settlement terminal; and
determining, by the payment terminal according to the terminal transaction attribute, that the settlement terminal does not support a consumer device cardholder verification method (CD-CVM).

6. The method according to claim 5, wherein obtaining the terminal transaction attribute of the settlement terminal comprises:
receiving, by the payment terminal from the settlement terminal, a select application identifier (SELECT AID) command; and
sending, by the payment terminal to the settlement terminal, a processing options data object list (PDOL) requesting the terminal transaction attribute of the settlement terminal.

7. The method according to claim 1, further comprising:
receiving, by the payment terminal, a transaction success notification pushed by the cloud verification server;
marking, by the payment terminal in a transaction log, a type of the payment transaction as a downgraded CVM transaction; and
synchronizing, by the payment terminal, the transaction log to the cloud verification server.

8. A payment terminal, comprising:
a near field communication (NFC) module;
a processor; and
a non-transitory computer readable storage medium storing instructions that, when executed by the processor, cause the processor to:
   detect first verification information in a secure storage of the payment terminal, the first verification information comprising a quantity of payment transactions, wherein the secure storage of the payment terminal is a trusted storage area in a trusted execution environment (TEE) or a secure storage area in a rich execution environment (REE);
   determine whether the first verification information is valid, wherein determining whether the first verification information is valid comprises determining whether the quantity of payment transactions exceeds a threshold; and
   send, to a cloud verification server, in response to determining that the first verification information is invalid, a verification request that comprises a verification parameter, wherein the verification parameter comprises a cardholder telephone number of a card bound to a user Program of the payment terminal;
   receive, from the cloud verification server, second verification information, the second verification information having been generated and sent based on successful verification of the verification parameter;
   change, in response to determining that the second verification information is valid, a cardholder verification method (CVM) supported by a currently-used payment card to a no CVM required payment method, wherein the currently-used payment card has been preset card or selected by a user; and
wherein the NFC module is configured to notify a settlement terminal that the CVM supported by the currently-used payment card is the no CVM required payment method, causing the settlement terminal to perform a verification on the user and to complete a payment transaction according to the no CVM required payment method.

9. The payment terminal according to claim 8, wherein the payment terminal further comprises a transceiver and a Wi-Fi module;
wherein the transceiver or the Wi-Fi module is configured to receive first identity verification data; and
wherein the processor is configured to determine that the first identity verification data matches second identity verification data that is stored in the secure storage.

10. The payment terminal according to claim 8, wherein:
the first verification information further comprises a validity period parameter indicating a time period during which the first verification information is valid;
the validity period parameter is a preset validity time set by the cloud verification server; and
determining whether the first verification information is valid further comprises determining whether the preset validity time corresponding to the first verification information has not expired.

11. The payment terminal according to claim 8, wherein:
the quantity of payment transactions has been set by the cloud verification server;
the threshold is equal to zero; and
the processor is further configured to decrement, in response to the payment terminal performing a successful payment transaction using the currently-used payment card, the quantity of payment transactions by one.

12. The payment terminal according to claim 8, wherein:
the NFC module is further configured to obtain a terminal transaction attribute of the settlement terminal, wherein the terminal transaction attribute indicates a CVM method supported by the settlement terminal; and
the processor is further configured to determine, according to the terminal transaction attribute, that the settlement terminal does not support a consumer device cardholder verification method (CD-CVM).

13. The payment terminal according to claim 8, wherein the payment terminal further comprises a Bluetooth module and an image acquisition module; and
wherein the processor is further configured to:
   obtain a terminal transaction attribute of the settlement terminal by sending, using the NFC module, a processing options data object list (PDOL) to the settlement terminal, wherein the PDOL is sent by the payment terminal after the payment terminal receives a select application identifier (SELECT AID) command sent by the settlement terminal; or
   obtain the terminal transaction attribute of the settlement terminal by scanning, using the image acquisition module, a quick response (QR) code that comprises a uniform resource locator (URL) for obtaining the terminal transaction attribute of the settlement terminal; or obtain the terminal transaction attribute of the settlement terminal by receiving, using the Bluetooth module, a Bluetooth low energy (BLE) broadcast message.

14. The payment terminal according to claim 8, wherein the payment terminal further comprises a transceiver and a Wi-Fi module, and the transceiver or the Wi-Fi module is configured to:

receive a transaction success notification pushed by the cloud verification server;

mark, in a transaction log, a type of the payment transaction as a downgraded CVM transaction; and synchronize the transaction log to the cloud verification server.

15. A non-transitory computer readable storage medium storing instructions that, when executed by a processor, cause the processor to:

detect first verification information in a secure storage of a payment terminal, the first verification information comprising a quantity of payment transactions, and the secure storage of the payment terminal being a trusted storage area in a trusted execution environment (TEE) or a secure storage area in a rich execution environment (REE);

determine whether the first verification information is valid, wherein determining whether the first verification information is valid comprises determining whether the quantity of payment transactions exceeds a threshold;

send, to a cloud verification server, in response to determining that the first verification information is invalid, a verification request that comprises a verification parameter, wherein the verification parameter comprises a cardholder telephone number of a card bound to a user program of the payment terminal;

receive, from the cloud verification server, second verification information, the second verification information having been generated and sent based on successful verification of the verification parameter;

change, in response to determining that the second verification information is valid, a cardholder verification method (CVM) supported by a currently-used payment card to a no CVM required payment method, wherein the currently-used payment card has been preset or selected by a user; and notify a settlement terminal that the CVM supported by the currently-used payment card is the no CVM required payment method, causing the settlement terminal to perform a verification on the user and to complete a payment transaction according to the no CVM required payment method.

16. The method according to claim 5, wherein obtaining the terminal transaction attribute of the settlement terminal comprises:

scanning, by the payment terminal, a quick response (QR) code comprising a uniform resource locator (URL); and obtaining, by the payment terminal, the terminal transaction attribute of the settlement terminal from the URL comprised by the QR code.

17. The method according to claim 5, wherein obtaining the terminal transaction attribute of the settlement terminal comprises:

receiving, by the payment terminal, a Bluetooth low energy (BLE) broadcast message comprising the terminal transaction attribute of the settlement terminal.

* * * * *

UNITED STATES PATENT AND TRADEMARK OFFICE
CERTIFICATE OF CORRECTION

| | |
|---|---|
| PATENT NO. | : 11,055,720 B2 |
| APPLICATION NO. | : 16/312917 |
| DATED | : July 6, 2021 |
| INVENTOR(S) | : Guoqing Li |

It is certified that error appears in the above-identified patent and that said Letters Patent is hereby corrected as shown below:

On the Title Page

Item (73) Assignee, delete "Lid.," and insert --Ltd.,--

Signed and Sealed this
Fourteenth Day of June, 2022

Katherine Kelly Vidal
*Director of the United States Patent and Trademark Office*